(12) United States Patent
Garcia et al.

(10) Patent No.: US 12,132,612 B2
(45) Date of Patent: Oct. 29, 2024

(54) DISPLAY DEVICE IN PROCESS AUTOMATION

(71) Applicant: VEGA GRIESHABER KG, Wolfach (DE)

(72) Inventors: Juan Garcia, Biberach (DE); Ralf Hoell, Titisee-Neustadt (DE)

(73) Assignee: VEGA GRIESHABER KG, Wolfach (DE)

( * ) Notice: Subject to any disclaimer, the term of this patent is extended or adjusted under 35 U.S.C. 154(b) by 0 days.

(21) Appl. No.: 17/673,275

(22) Filed: Feb. 16, 2022

(65) Prior Publication Data
US 2022/0263717 A1    Aug. 18, 2022

(30) Foreign Application Priority Data
Feb. 17, 2021   (EP) .................................. 21157562

(51) Int. Cl.
*H04L 41/0866* (2022.01)
*G06F 3/14* (2006.01)
*H04L 41/12* (2022.01)

(52) U.S. Cl.
CPC ............ *H04L 41/0866* (2013.01); *G06F 3/14* (2013.01); *H04L 41/12* (2013.01)

(58) Field of Classification Search
CPC ... H04L 41/0866; H04L 41/12; H04L 41/022; H04L 41/26; H04L 67/12; H04L 12/10; H04L 12/40; H04L 69/08; H04L 69/326; H04L 2012/40208; G06F 3/14; G05B 19/4185

See application file for complete search history.

(56) References Cited

U.S. PATENT DOCUMENTS

| | | | |
|---|---|---|---|
| 10,862,712 B1* | 12/2020 | Christie | .................... G05F 1/10 |
| 2003/0236937 A1* | 12/2003 | Barros De Almeida | ..................... H04L 12/5692 710/305 |
| 2008/0075012 A1 | 3/2008 | Zielinski et al. | |
| 2011/0060427 A1* | 3/2011 | Batke | .................. H04L 41/0226 700/79 |
| 2014/0188933 A1 | 7/2014 | Chomik et al. | |
| 2017/0373872 A1* | 12/2017 | Zhang | .................... G06F 13/426 |
| 2018/0027071 A1 | 1/2018 | Toepke et al. | |
| 2018/0309637 A1* | 10/2018 | Gill | ........................ H04L 41/145 |
| 2019/0246353 A1* | 8/2019 | Jensen | ..................... H04L 67/12 |
| 2021/0123821 A1* | 4/2021 | Laurila | ................ G01K 15/005 |
| 2022/0078252 A1* | 3/2022 | Nixon | ..................... H04L 67/12 |
| 2022/0091591 A1* | 3/2022 | Miller | ................. G05B 19/4183 |

FOREIGN PATENT DOCUMENTS

DE    10 2018 101 799 A1    8/2019

* cited by examiner

*Primary Examiner* — Tonia L Dollinger
*Assistant Examiner* — Joseph M Cousins
(74) *Attorney, Agent, or Firm* — Oblon, McClelland, Maier & Neustadt, L.L.P.

(57) ABSTRACT

A display device for displaying data in a process automation Ethernet network having a specified physical layer and one or more different higher layer network protocols, the display device being arranged to detect one or more subscriber devices of the network and to display measured values of the one or more subscriber devices.

20 Claims, 1 Drawing Sheet

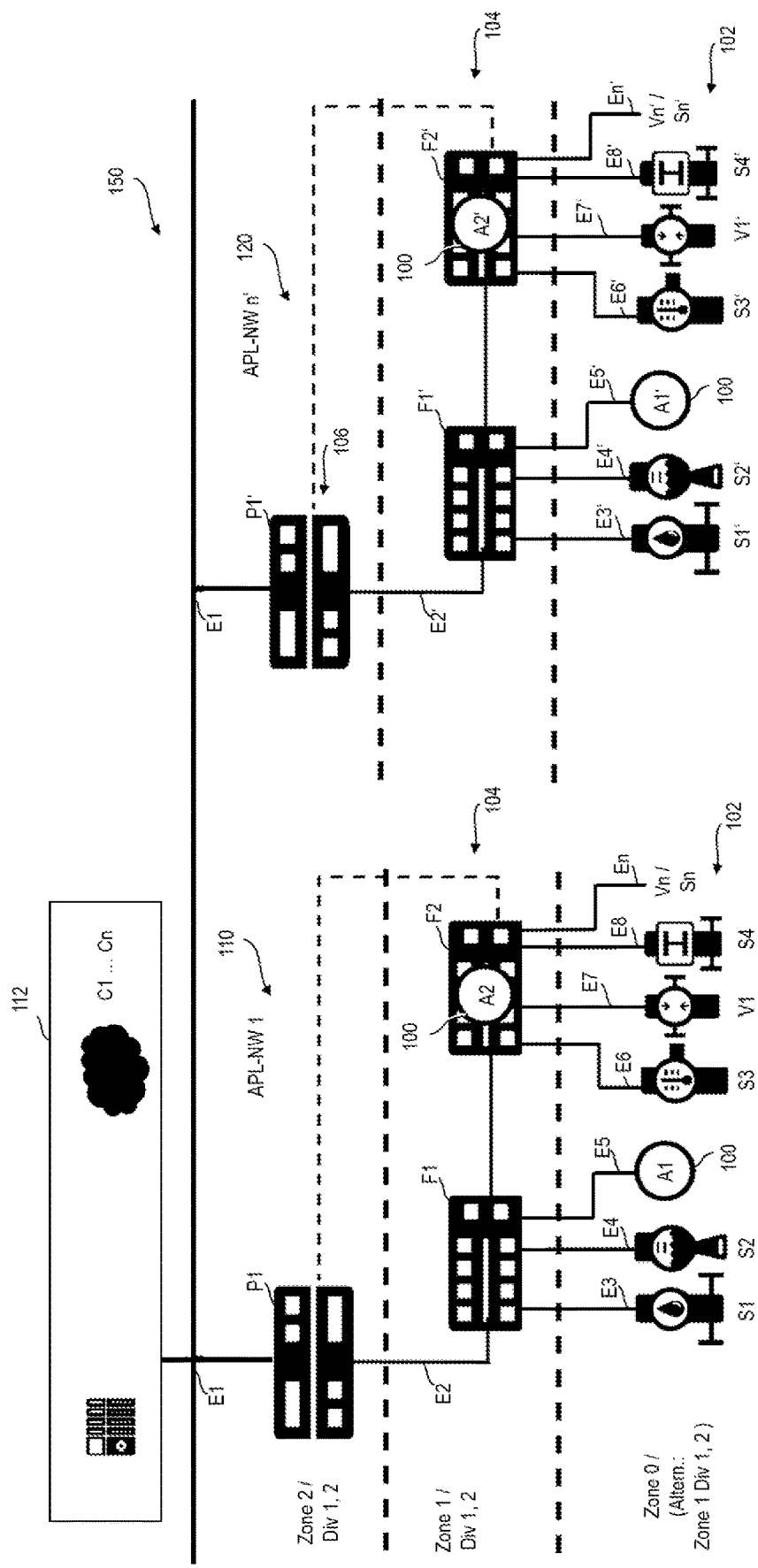

DISPLAY DEVICE IN PROCESS AUTOMATION

CROSS-REFERENCE TO RELATED APPLICATIONS

This application claims the benefit of the filing date of European Patent Application No. 21 157 562.6 filed on 17 Feb. 2021, the entire content of which is incorporated herein by reference.

FIELD

The disclosure relates to a display device in a two-wire Ethernet network in process automation, a switch, a process automation network comprising such a display device, and a use of such a display device.

BACKGROUND

Devices in process automation such as sensors, control devices, actuators, display devices, etc. usually communicate via a standard such as the fieldbus, typically expressed as Foundation Fieldbus in process automation, or the Profibus, typically expressed as Profibus PA in process automation. Display devices can display measured values of other subscriber devices connected to this bus via the Profibus. Which subscriber device is to be visualized as a Profibus slave is set by addressing with individual Profibus addresses, for example by means of a DIP switch or by means of software. For the transmission of digital signals, an Ethernet connection can still be used.

However, the previous addressing thus the collection of data from the subscriber devices in a process automation network to display their data is cumbersome and limited.

SUMMARY

There may be a desire to improve display devices in a network, for example an Ethernet network, of process automation.

The embodiments described similarly relate to the display device in a process automation network, the field switch, the process automation network, and the use of such display device. Synergistic effects may result from various combinations of the embodiments, although they may not be described in detail.

According to a first aspect, a display device for displaying subscriber device data in a two-wire Ethernet process automation network having a specified physical layer of the two-wire Ethernet network and one or more different network protocols of the higher layers is provided. The display device is connected to the two-wire Ethernet network and is arranged to detect one or more subscriber devices of the network, and to display data of the subscriber devices.

The two-wire Ethernet network has in particular the property that both power and data can be transmitted via the two-wire cable. Thus, for example, the entire two-wire Ethernet network can be supplied with power via a power switch. The power switch forms the transition to a conventional four-wire Ethernet, to which several such power switches can be connected. All field switches connected to a power switch and in turn all subscriber devices connected to these field switches define a two-wire Ethernet network. The field switch is intrinsically safe. This means that it supplies the devices of the two-wire Ethernet network with a maximum of as much power as required. Even in the event of a fault, no higher current is supplied.

The two-wire Ethernet network has a specified protocol and one or more different higher layer network protocols above the physical layer protocol specified for these network protocols, e.g. an APL (Advanced Physical Layer) layer. If there are multiple interconnected two-wire Ethernet networks in an overall network, these networks have the same specified layer, for example, but may have different higher layer network protocols. The network protocols of the higher layers of the OSI model are, for example, Ethernet protocols such as Profinet, Ethernet/IP, HART-IP, EtherCAT, OPC-UA, etc. The display device can in principle detect all subscriber devices in the two-wire Ethernet network without having to know the addresses of the subscriber devices in the network beforehand or having to specify a subscriber device address.

In this disclosure, instead of "display device", the term "display" is also used equivalently.

According to one embodiment, the display device is an independent, i.e., stand-alone, display device that is directly connected to a field switch of the two-wire Ethernet network, or it is integrated into a field switch, i.e., for example, an on-site gateway.

The term "field switch" is familiar to those skilled in the art and refers to a switch known from network technology, which can be translated as "network switch". "Field" is a process automation term and can also be translated here as "field" according to the field devices. In this disclosure, the switch may also process higher network layer protocols and, according to some embodiments, may also perform protocol conversion.

As a self-sufficient "stand-alone" display, the display device behaves like a subscriber device in the network. In this way, the display device can be located anywhere in the two-wire Ethernet network. From a topological point of view, a suitable connection point in this network for the stand-alone display would be the point-to-point connection after a field switch in the so-called "track" area of the Ethernet network, whose outputs can each have a line length of up to 200 meters. From a positional perspective, a suitable installation location in the plant would be a highly visible and recognizable position that can be easily viewed by a human. As a combination device, the display can alternatively be integrated in the field switch (gateway in the field). In this case, the display is located centrally at the installation site of the field switch devices. These are usually accessible areas where a display is also well placed, e.g. for convenient reading of the data.

A suitable installation area for the stand-alone display or the integrated field switch display unit is in the field, close to the application, which in many cases can also be located in hazardous areas up to at least Ex zone 1. The display unit can either meet the Ex zone 2 and 1 requirements itself or detect subscriber devices under Ex zone 2, 1 and 0 and display their measured values.

Installation of the indicator or field switch with integrated display directly in Ex zone 0 is unusual, but possible.

This allows that the display device can be placed close to the application on the one hand to get an on-site visualization of the above mentioned information, which enables the on-site technician to get a direct feedback or also security regarding the measurement by visualizing the information in a timely manner without any further tools or Ethernet-based communication devices, but on the other hand also displays data and messages from remote subscriber devices to the technician.

Subscriber devices here are, for example, sensors, actuators such as valves, pumps, motors, control devices, etc., or other display devices. The devices may be two-wire Ethernet devices, which can also be specified according to Ex (explosive) requirements and used in the network. Sensors are e.g. a level sensor, a point level sensor, a pressure sensor, a sensor that measures a density or a composition or mixture of a substance during a process.

In addition to measured values or process values, subscriber device data can also be device identification information, diagnostic data and messages, status information, limit values and information about the subscriber devices that the display device records and displays. Furthermore, a display of calculated values such as totals, difference, flow, scaled values, etc. as well as trend observations, e.g. by displaying measured values over time, can be displayed graphically.

According to an embodiment, the display device is an APL display device and the specified physical layer is an APL transmission layer. Thus, an APL-based Ethernet system is formed. Thus, the display device may be a display device for APL networks. APL is standardized in IEEE 802.3cg (10BASE-T1L) and is applicable to both simple and complex sensors with two-wire feeding. APL simultaneously allows electrical power supply as well as communication via the two-wire of the two-wire Ethernet devices and is suitable for Ex applications (e.g. intrinsic safety according to IEC 60079-11). The possible cable lengths of an APL network are adapted to the requirements of process automation and are thus significantly longer than conventional Ethernet networks with a different physical layer.

According to an embodiment, the two-wire Ethernet network is a subnetwork of an Ethernet network comprising a plurality of two-wire Ethernet networks as subnetworks, wherein within a two-wire Ethernet network the higher-layer protocol is the same, the subnetworks are interconnected via an Ethernet backbone, and wherein the display device is further arranged to detect a subscriber device of another subnetwork. The display device can thus detect devices of its own, e.g. APL, subnetwork with a first higher-layer protocol as well as devices of other, e.g. APL, subnetworks with a second or third higher-layer protocol, wherein the subnetworks are connected to an Ethernet backbone that is not based on APL.

The typical infrastructure for APL networks would be as follows: The Ethernet, which is used in the control room and forms the so-called backbone, is connected to the controller or PLC or control system and leads to a power switch, the so-called APL power switch. The Ethernet can differ here also in the physical layer to the specified physical APL layer. Like the display and control unit itself, the subscriber devices connected to the network can be, in particular, two-wire Ethernet sensors or actuators, positioners, control units, etc., which can also be located in a potentially explosive ("Ex") environment. The APL power switch, which is separately supplied with electrical power, generates an APL Exe branch, i.e. a branch with increased safety for which high electrical power is available. This can be followed, for example, by different APL field switch modules arranged up to Ex zone 1, to which 1 to n APL field devices can each be connected in point-to-point wiring, depending on the number of channels. These supply themselves from the APL system in terms of energy. Intrinsically safe branches, also called "spurs", with intrinsically safe (Exi) APL field devices can also be connected to the APL field switch modules. One or more APL display devices can be connected to different "spurs" as required. In the case of intrinsic safety, the application can be based, for example, on the FISCO (Fieldbus Intrinsically Safe Concept), which is used with Profibus and Foundation Fieldbus, and enables simple calculation of the intrinsically safe participants on the network.

According to an embodiment, the display device is set up to display subscriber devices according to a configuration. That is, the list of APL devices to be visualized can be specifically parameterized beforehand in the APL display so that data from these configured devices is displayed. It should be noted here that this configuration is independent of the acquisition of the devices. Ultimately, this configuration will display those that are in the network and have been acquired, but at the same time have also been configured for visualization. However, a limitation of the acquisition can also take place by a configurable, permissible address range.

The configuration can have different parameters. For example, a parameter defines which subscribers are to be displayed. Values here can be, for example, IP addresses or other identification information. Further, values may be a subscriber type, such as a field device type such as a sensor or sensor type, an actuator or actuator type, a controller, or another display device. In a default configuration, the display device may display readings from a local field device next to which it is located. The configuration for the display may further include types of display, such as units, or filters on the type of information to be displayed.

This includes, for example, whether a time series should be displayed, whether the time series is a processed time series, whether or which diagnostic, status and warning messages should be displayed, etc.

The APL display can operate as a pure display for one or more APL field devices (pressure, temperature, level, flow, positioner, valve positions, etc.) or also as a display for one or more APL field devices with additional functionality or additional tasks. The APL display unit visualizes, in addition to recognition information such as measuring point name, IP address, etc., above all the measured values of individual or all APL participants, either as sequential information, displayed one after the other or summarized. In addition, diagnostic information from individual or all APL subscribers is displayed (sequentially), individually or also as collective diagnostic information, e.g. as "health status". This can be based on standards such as the NE 107 nameplate recommendation. This information can thus be visualized or displayed on site, close to the application. The plant operator or the service employee on site receives the required information in an uncomplicated and immediate manner.

According to an embodiment, the display device is set up to convert different network protocols. The display device can thus serve as a converter of different protocols from e.g. Profinet to Ethernet/IP, etc. This can be particularly advantageous if the APL field devices do not support all protocols, so that the display device can convert the protocol for communication with this field device.

According to an embodiment, the display device comprises a web browser and/or an Open Platform Communications Unified Architecture (OPC UA) client, wherein the web browser or the OPC UA client is set up to detect the subscriber devices, to acquire data, such as identifiers, measured values, statuses, etc., from the subscriber devices, and to process and display the data. The web browser can be implemented as a client and can further be set up to apply the configuration already detailed above for visualizing specific devices or also a configuration for capturing, for example, a specific address range representing, for example, a subnetwork.

An OPC UA client can be used to retrieve data from other devices in a standardized manner. The display device can also have an OPC UA server, for example in addition to the OPC UA client, so that a higher-level controller can retrieve data from the display device, for example.

According to an embodiment, the web browser is set up to send a broadcast signal to detect the subscriber devices on the network. Here, the web browser automatically detects via broadcast all connected APL field devices that are either in its own APL network but also in neighboring APL networks of the relevant system. For this purpose, the web browser is configured e.g. as a client, and sends e.g. a request signal as a broadcast signal, to which the subscriber devices respond with a response signal. The broadcast signal can be a limited broadcast signal in its own (sub)network without forwarding by a router, or a directed broadcast signal that is also routed to other networks or subnetworks.

According to an embodiment, the web browser receives a broadcast signal from a subscriber device to acquire the subscriber device. In this case, the subscriber device is configured as a server. For example, a process device sends a broadcast message as a broadcast signal so that they can be viewed by any display device on the network.

The APL display can thus work as a web browser and automatically detect via broadcast all connected APL field devices that are either in its own APL network or in neighboring APL networks of the plant concerned. The communication can take place according to http, https, OPC-UA or NAMUR protocol.

According to an embodiment, the display device is set up to enable an additional network connection according to a configuration or a control. The additional network connection is, for example, a data channel or communication channel to the "outside", i.e. to an active or, until the data line is enabled, inactive subnetwork. The subnetwork can thus in particular also be a network that is connected via a switch or the Internet to the network in which the display device is located. In this way, the display device meets in particular the requirement of a "second communication channel" of the chemical and petrochemical and pharmaceutical industry additional functions according to the NOA (NAMUR Open Architecture).

Through the further communication channel, a central on-site reporting system is formed, which can send data and information via email, radio technologies such as GSM, GPRS, UMTS, LTE, SMS, LoRa, WLAN, etc., etc., etc. can send data and information according to e.g. the NOA-recommendation. The second communication channel can be established, for example, via the web browser, or via another entity, such as a wireless connection like WLAN, over which an Internet connection is possible, a cellular connection, or an email connection, which can be implemented wirelessly or wired, via the web browser or another email client.

Can be used as on-site message system or on-site visualization with colors according to NE 107 (NAMUR recommendation 107) or own color definition by the plant operator.

According to an embodiment, the display device has one or more, for example, integrated relay modules and/or transistor outputs that are set up to output a signal for a limit value message, limit level exceeded, diagnostic message information, a collective fault message, a fault message, an emergency shutdown, an on-site pump shutdown, and/or to switch an acoustic or optical warning device, such as a horn or a warning light.

According to an aspect, there is provided a switch comprising a display device described herein.

According to an aspect, there is provided a process automation network comprising such a switch and/or a display device described herein.

According to an embodiment, the process automation network comprises at least one two-wire Ethernet subnetwork and the display device is disposed in a two-wire Ethernet subnetwork (110, 120), and wherein each subnetwork comprises at least one subscriber device. The subnetworks are, for example, APL networks interconnected by an Ethernet backbone. The various APL networks of the system can be viewed as an overall IP address space in the control room via the common Ethernet, i.e., the backbone. The protocol used (e.g., Profinet, Ethernet/IP, HART-IP, EtherCAT, OPC-UA . . . ) is usually the same across the plant but may be different in different APL networks.

According to an aspect, a use of a display device described herein in a process automation network is provided.

Process automation in the industrial environment can be understood as a subfield of technology that includes all measures for the operation of machines and plants without the involvement of humans. One goal of process automation is to automate the interaction of individual components of a plant in the chemical, food, pharmaceutical, petroleum, paper, cement, shipping or mining industries. For this purpose, a variety of sensors, actuators/positioners, etc. can be used, which are especially adapted to the specific requirements of the process industry, such as mechanical stability, insensitivity to contamination, extreme temperatures and extreme pressures. Measured values from these sensors are usually transmitted to a control room, where process parameters such as level, limit level, flow, pressure or density can be monitored and settings for the entire plant can be changed manually or automatically. In the same way, signals can be transmitted to actuators or positioners, usually from a control room. For actuators or positioners, the direction of action of the signal is the opposite of that for sensors. The platform, the APL network, remains the same.

The configuration or setup of the display device can be at least partially given by a software, a program or computer program, a program element, and/or a hard-wired logic. The program element may be a part of a computer program, but it may also be a whole program by itself. For example, the program element may be used to update an existing computer program to arrive at the present embodiments. The programmed logic may be stored on a computer-readable medium that may be considered a storage medium, such as a USB flash drive, a CD, a DVD, a data storage device, a hard drive, or any other storage medium.

The program element may be programmed or hardwired logic or a mixture thereof. To execute the program element, the computing unit may include a processor To bring the programmed or hardwired logic into effect, the customization module may include a processor, general-purpose central processing unit (CPU), graphics processing unit (GPU), microcontroller, microcomputer, programmable logic controller (PLC), reduced instruction set processor (RISC processor), field programmable gate array (FPGA), digital signal processor (DSP), application-specific integrated circuit (ASIC), and/or other programmable circuits or processing devices.

Other variations of the disclosed embodiments may be understood and carried out by those skilled in the art in carrying out the claimed embodiments by studying the drawings, the disclosure, and the appended claims. In the claims, the word "comprising" does not exclude other elements or steps, and the indefinite article "a" or "one" does not exclude a plurality. A single processor or other unit may perform the functions of multiple items or steps recited in the claims. The mere fact that certain actions are recited in interdependent claims does not mean that a combination of those actions cannot be advantageously used.

BRIEF DESCRIPTION OF THE FIGURES

In the following, embodiments of the present disclosure are described in detail with reference to the accompanying figures. Neither the description nor the figures are to be construed as limiting the scope of the present disclosure.

FIG. 1 shows a block diagram of a process automation network according to an embodiment.

DETAILED DESCRIPTION OF THE EMBODIMENTS

The display devices A1, A2, A1', and A2' are grouped under reference numeral 100, the APL field switches F1, F2, F1', and F2' are grouped under reference numeral 104, the APL power switches are grouped under reference numeral 106, and the Ethernet APL devices or subscriber devices are grouped under reference numeral 102.

By supporting line lengths of up to 1000 m at 10 Mbit/s, in future 100 Mbit/s in full duplex in the main branch (below the APL power switch also called "trunk") and up to 200 m sub-branches each (below the APL field switch also called "track"), APL is suitable for the requirements of process automation. Different topologies, such as ring, line, star, are possible. Furthermore, a standardized PA-DIM (Process Automation Device Information Model) facilitates the visualization of different APL field devices from different manufacturers in the APL display device by means of uniform, machine-readable semantics of field devices.

The explanations regarding network 110 apply analogously to network 120.

An Ethernet network is shown consisting of an "office Ethernet area" E1, the so-called backbone, to which different controllers (PLC/DCS), Scada,
Parameterization or operating programs, asset management programs or even cloud applications 112 can be connected. One or more APL networks APL-NW 1, 110, . . . , APL-NW n', 120 are connected below the APL power switch (P1, P1'). The sum of all APL networks APL-NW 1, . . . , APL-NW n' can also be considered as APL network group, APL network environment or overall network 150. The APL network 110 starts with the APL power switch P1 which establishes a high power APL branch E2. Several APL field switches F1 . . . Fn 104 can be connected to this APL branch, which can also be designed in increased security ("Exe"). The actual APL field devices 102, S1 Sn or V1 . . . Vn are connected to these via the intrinsically safe point-to-point connections E3 . . . En. Instead of intrinsically safe, the above-mentioned can also be designed as non-intrinsically safe in non-Ex systems. S1 . . . Sn stand for APL sensors, V1 . . . Vn stand for APL valves or APL positioners. One of these intrinsically safe point-to-point connections, E5, can be used, for example, to connect an APL display unit A1.

The self-sufficient and independently operating APL indicator A1 uses its own housing, which can also be set up on site, in a harsh environment.

Alternatively, the APL display unit A2 can also be integrated in the APL field switch F2, for example. In this case, it performs the same tasks at a central location as the autonomous and independently operating APL display unit A1, but in this embodiment, it does not have its own housing, but is to be seen as a component or partial functionality of the APL field switch F2.

Corresponding to the APL display units A1 or A2, the APL display unit A1' and/or A2' can be used in adjacent APL networks n'. A restriction to a certain number of APL display units in an APL network APL-NW 1 . . . APL-NW n' is not necessary.

Any APL display device in this example A1, A2, A1' or A2' can receive data from Display any APL devices in the APL network group 1 . . . n'.

The APL display units A1, A2, A1' or A2' shown here in the example are parameterized to target APL devices that are to be displayed in the APL display unit. This can be done via on-site operation, on-site interface, wirelessly (e.g., via Bluetooth and operating program), or via the network and an operating program that can be used to define the desired APL sensors to be visualized in the APL display device. These can be one or more of the 1 . . . n APL devices, such as S1 . . . Sn as well as V1 . . . Vn. Likewise, a wire-based interface such as a USB cable with sensor parameterization interface (e.g. I$^2$C interface) and an operating program can be used.

The APL display A1, A2, A1' or A2' works as a web browser and automatically detects via broadcast all connected APL field devices S1 . . . Sn as well as V1 . . . Vn, which are either located in the own APL network "APL-NW 1, but also in neighboring APL networks APL-NW n' of the relevant overall Ethernet system 150. The protocol used in the Ethernet network (APL network and backbone) 150 (e.g., Profinet, Ethernet/IP, HART-IP, EtherCAT . . . ) is usually the same for all plants.

The APL display A1, A2, A1' or A2' visualizes, in addition to detection information such as. The measured values of individual or all APL stations S1 . . . Sn as well as V1 . . . Vn are displayed either as sequential information one after the other or summarized or condensed. In addition, diagnostic information from individual or all APL stations is displayed (sequentially) individually or also as collective diagnostic information.

If required, the APL display unit A1, A2, A1' or A2' can have an additional data channel to the "outside" in the sense of the NOA (NAMUR Open Architecture) requirement of a "second communication channel" of the chemical and petrochemical industry (NOA). This would mean that a main channel (communication channel 1) would be available via the Ethernet structure for the exchange of essential data such as measured values as before, as well as a second data channel (communication channel 2) that forwards other, permissible or desired data to parallel, higher-level systems (e.g. cloud) via a radio interface (GPS, GPRS, UMTS, LTE, 5G, LoRa, etc.).

Furthermore, the APL display unit A1, A2, A1' or A2' can also include a locally parameterizable relay module or transistor output(s) 1 . . . n and/or transistor outputs 1 . . . n. This is used for limit value indication, collective fault indication, fault messages, emergency shutdown, on-site pump shutdown, switching of warning devices (horn, warning light, etc.).

Further, the APL display device A1, A2, A1', or A2' may operate as a local on-site visualization system.

The APL display unit A1, A2, A1' or A2' can still be used as a protocol converter. of different protocols from e.g., Profinet to Ethernet/IP work.

If required, the APL indicator A1, A2, A1' or A2' can work as an on-site message system via email, SMS, SIM card, LoRa, \Man, etc. in the sense of a second communication channel (NOA), as well as serve as an on-site visualization with colors according to NAMUR recommendation NE107 or the plant operators own color definition.

The drawing is merely schematic and not to scale. In principle, identical or similar parts are provided with the same reference signs.

In FIG. 1, the following reference signs are used:
C1 . . . Cn Controls such as PLC, DCS, Cloud applications, Asset Management programs, operating programs . . .
E1 Ethernet network (office/control room area) also backbone called
P1 APL Power Switch from the first APL network below the backbone
P1' APL Power Switch from the "n"th APL network below the backbone
E2 Ethernet APL network from first APL network
E2' Ethernet APL network from "n"th APL network
F1 APL field switch 1 from the first APL network
F1' APL field switch 1 from the "n"th APL network
F2 APL field switch 2 from the first APL network
F2' APL field switch 2 from the "n"th APL network
A1 APL display 1 connected point-to-point at switch F1
A1' APL display 1' connected point-to-point at switch F1'.
A2 APL display 2 integrated in APL field switch F2
A2' APL display 2' integrated in APL field switch F2'.
E3 . . . En Ethernet APL point-to-point connections to the APL devices in the APL-Network 1
E3' . . . En' Ethernet APL point-to-point connections to the APL devices in the APL-Network n'
S1 . . . Sn Ethernet APL devices (sensors) in network 1
S1' . . . Sn' Ethernet APL devices (sensors) in the network n'
V1 . . . Vn Ethernet APL devices (positioners/valves) in network 1
V1' . . . Vn' Ethernet APL devices (positioners/valves) in the network n'
100 Display device(s)
102 Ethernet APL device(s) (subscriber devices)
104 APL field switch(es)
106 APL Power Switch(es)
112 Control system/Cloud application
110 Subnetwork APL-NW 1
120 Subnetwork APL-NW n'
150 Ethernet network

The invention claimed is:

1. A display device comprising:
circuitry configured to display subscriber device data in a two-wire Ethernet network for process automation having a specified physical layer of the two-wire Ethernet network and one or more different network protocols of higher layers,
wherein the circuitry of the display device is connected to the two-wire Ethernet network and configured to detect a plurality of subscriber devices of the two-wire Ethernet network and to display data of the plurality of subscriber devices, and
wherein the display device is a device of the two-wire Ethernet network for process automation.

2. The display device of claim 1, wherein the display device is a standalone display device directly connected to a field switch of the two-wire Ethernet network, or integrated into a field switch.

3. The display device according to claim 2, wherein the display device is an APL display device and the specified physical layer is an APL transmission layer.

4. The display device according to claim 2,
wherein the two-wire Ethernet network is a subnetwork of an Ethernet network having a plurality of two-wire Ethernet networks as subnetworks,
wherein within the two-wire Ethernet network a protocol of higher layers is the same,
wherein the subnetworks are interconnected via an Ethernet backbone, and
wherein the circuitry of the display device is further configured to detect a subscriber device of another two-wire Ethernet network.

5. The display device according to claim 2, wherein the display device is configured to display a subscriber device according to a configuration.

6. The display device according to claim 1, wherein the display device is an APL display device and the specified physical layer is an APL transmission layer.

7. The display device according to claim 6,
wherein the two-wire Ethernet network is a subnetwork of an Ethernet network having a plurality of two-wire Ethernet networks as subnetworks,
wherein within the two-wire Ethernet network a protocol of higher layers is the same,
wherein the subnetworks are interconnected via an Ethernet backbone, and
wherein the circuitry of the display device is further configured to detect a subscriber device of another two-wire Ethernet network.

8. The display device according to claim 6, wherein the display device is configured to display a subscriber device according to a configuration.

9. The display device according to claim 1,
wherein the two-wire Ethernet network is a subnetwork of an Ethernet network having a plurality of two-wire Ethernet networks as subnetworks,
wherein within the two-wire Ethernet network a protocol of higher layers is the same,
wherein the subnetworks are interconnected via an Ethernet backbone, and
wherein the circuitry of the display device is further configured to detect a subscriber device of another two-wire Ethernet network.

10. The display device according to claim 1, wherein the display device is configured to display a subscriber device according to a configuration.

11. The display device according to claim 1, wherein the display device is configured to implement different network protocols.

12. The display device according to claim 1, wherein the display device comprises a web browser and/or an Open Platform Communications Unified Architecture (OPC UA) client, wherein the web browser or the OPC UA client is configured to detect the plurality of subscriber devices, to acquire data from the plurality of subscriber devices, and to process and display the data.

13. The display device according to claim 12, wherein the web browser sends a broadcast signal to detect the plurality of subscriber devices.

14. The display device of claim 12, wherein the web browser receives a broadcast signal from a subscriber device to detect the subscriber device on the network.

15. The display device according to claim 1, wherein the display device is configured to enable an additional network connection according to a configuration or a control.

16. The display device according to claim 1, wherein the display device further includes one or more relay modules and/or transistor outputs, which are configured to output a signal for a limit value message, limit level exceeded, diagnostic message information, a collective fault message, a fault message, an emergency shutdown, an on-site pump shutdown and/or to switch an acoustic or optical warning device.

17. A field switch comprising:
   a display device having circuitry configured to display subscriber device data in a two-wire Ethernet network for process automation having a specified physical layer of the two-wire Ethernet network and one or more different network protocols of higher layers,
   wherein the circuitry of the display device is connected to the two-wire Ethernet network and configured to detect a plurality of subscriber devices of the two-wire Ethernet network and to display data of the plurality of subscriber devices, and
   wherein the display device is a device of the two-wire Ethernet network for process automation.

18. A process automation network, comprising:
   a display device having circuitry configured to display subscriber device data in a two-wire Ethernet network for process automation having a specified physical layer of the two-wire Ethernet network and one or more different network protocols of higher layers,
   wherein the circuitry of the display device is connected to the two-wire Ethernet network and configured to detect a plurality of subscriber devices of the two-wire Ethernet network and to display data of the plurality of subscriber devices; and/or
   a field switch including the display device, and
   wherein the display device is a device of the two-wire Ethernet network for process automation.

19. The process automation network of claim 18, further comprising at least one two-wire Ethernet subnetwork, wherein the display device is disposed in a two-wire Ethernet subnetwork, and wherein each subnetwork includes at least one subscriber device.

20. The process automation network according to claim 18, wherein the display device behaves as a subscriber device of the two-wire Ethernet network to the plurality of subscriber devices of the two-wire Ethernet network.

* * * * *